US012724542B2

(12) United States Patent
Nguyen et al.

(10) Patent No.: US 12,724,542 B2
(45) Date of Patent: Sep. 1, 2026

(54) DYNAMICALLY CONFIGURABLE DATA MODULATION IN MEMORY SYSTEMS

(71) Applicant: Micron Technology, Inc., Boise, ID (US)

(72) Inventors: Phong S. Nguyen, Livermore, CA (US); Dung Viet Nguyen, San Jose, CA (US); James Fitzpatrick, Laguna Niguel, CA (US); Steven Raymond Brown, Boise, ID (US)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 18/790,233

(22) Filed: Jul. 31, 2024

(65) Prior Publication Data

US 2025/0103214 A1 Mar. 27, 2025

Related U.S. Application Data

(60) Provisional application No. 63/539,715, filed on Sep. 21, 2023.

(51) Int. Cl.
*G06F 3/06* (2006.01)

(52) U.S. Cl.
CPC .......... *G06F 3/0616* (2013.01); *G06F 3/0659* (2013.01); *G06F 3/0679* (2013.01); *G06F 2212/7207* (2013.01)

(58) Field of Classification Search
CPC .... G06F 3/0616; G06F 3/0659; G06F 3/0679; G06F 2212/7207
See application file for complete search history.

(56) References Cited

U.S. PATENT DOCUMENTS

| | | | | |
|---|---|---|---|---|
| 8,065,494 | B2 | 11/2011 | Yoshida | |
| 10,175,906 | B2 | 1/2019 | Muralimanohar et al. | |
| 11,586,385 | B1 * | 2/2023 | Lercari | G06F 12/0246 |
| 2007/0086260 | A1 | 4/2007 | Sinclair | |
| 2008/0158979 | A1 | 7/2008 | Kamei et al. | |
| 2009/0132758 | A1 | 5/2009 | Jiang et al. | |
| 2009/0132895 | A1 | 5/2009 | Jiang et al. | |

(Continued)

FOREIGN PATENT DOCUMENTS

WO 2013173729 A1 11/2013

OTHER PUBLICATIONS

International Search Report and Written Opinion for International Application No. PCT/US2024/047565, mailed Dec. 24, 2024, 9 Pages.

(Continued)

*Primary Examiner* — Kalpit Parikh
(74) *Attorney, Agent, or Firm* — Lowenstein Sandler LLP

(57) ABSTRACT

Described are systems and methods for dynamically configurable data modulation in memory systems. An example memory sub-system comprises a controller managing one or more memory devices. The controller is configured to perform operations, comprising: receiving a unit of data to be stored on the memory device; identifying a set of parameter values characterizing a target location of the unit of data on the memory device; determining a modulation code corresponding to the set of parameter values; modulating the unit of data by a modulation operation identified by the modulation code; and storing, on the memory device, the modulated unit of data.

19 Claims, 9 Drawing Sheets

(56) References Cited

U.S. PATENT DOCUMENTS

| | | | | |
|---|---|---|---|---|
| 2011/0157992 | A1* | 6/2011 | Strasser | G06F 12/123 365/185.18 |
| 2013/0013854 | A1 | 1/2013 | Mun et al. | |
| 2013/0013870 | A1 | 1/2013 | Cronie et al. | |
| 2013/0086442 | A1 | 4/2013 | Baptist et al. | |
| 2013/0254466 | A1 | 9/2013 | Jiang et al. | |
| 2013/0268723 | A1 | 10/2013 | Jiang et al. | |
| 2015/0199267 | A1 | 7/2015 | Oh et al. | |
| 2015/0324253 | A1 | 11/2015 | Jiang et al. | |
| 2016/0299724 | A1 | 10/2016 | Vanaraj et al. | |
| 2017/0123668 | A1 | 5/2017 | Kim et al. | |
| 2017/0277433 | A1 | 9/2017 | Willcock | |
| 2018/0203616 | A1 | 7/2018 | Kwon et al. | |
| 2019/0258423 | A1 | 8/2019 | Rozman et al. | |
| 2020/0110714 | A1 | 4/2020 | Richter et al. | |
| 2020/0194063 | A1 | 6/2020 | El Gamal et al. | |
| 2020/0264810 | A1 | 8/2020 | Ahirwar et al. | |
| 2021/0034251 | A1 | 2/2021 | Choi et al. | |
| 2021/0349656 | A1 | 11/2021 | Adler et al. | |
| 2021/0382621 | A1* | 12/2021 | Muthiah | G06F 12/10 |
| 2022/0189544 | A1 | 6/2022 | Nguyen et al. | |
| 2022/0405207 | A1* | 12/2022 | Haj Aboutalebi | G06F 18/214 |
| 2023/0229342 | A1* | 7/2023 | Aiouaz | G11C 16/0483 |

OTHER PUBLICATIONS

International Search Report and Written Opinion for International Application No. PCT/US2024/047813, mailed Dec. 24, 2024, 9 Pages.

* cited by examiner

450 Modulation Codes
430 Memory Device
425 Modulated Data
435 Select Modulation Code
420 Modulation Operation
440 Operating Conditions
445 Target Location characteristics
410 Host Data
415 Host

DYNAMICALLY CONFIGURABLE DATA MODULATION IN MEMORY SYSTEMS

REFERENCE TO RELATED APPLICATIONS

This application claims the priority benefit of U.S. Provisional Application No. 63/539,715, filed Sep. 21, 2023, which is incorporated by reference herein.

TECHNICAL FIELD

Implementations of the disclosure relate generally to memory sub-systems, and more specifically, to dynamically configurable data modulation in memory systems.

BACKGROUND

A memory sub-system can include one or more memory devices that store data. The memory devices can be, for example, non-volatile memory devices and volatile memory devices. In general, a host system can utilize a memory sub-system to store data at the memory devices and to retrieve data from the memory devices.

BRIEF DESCRIPTION OF THE DRAWINGS

The present disclosure will be understood more fully from the detailed description given below and from the accompanying drawings of various implementations of the disclosure.

DETAILED DESCRIPTION

Figure 1:
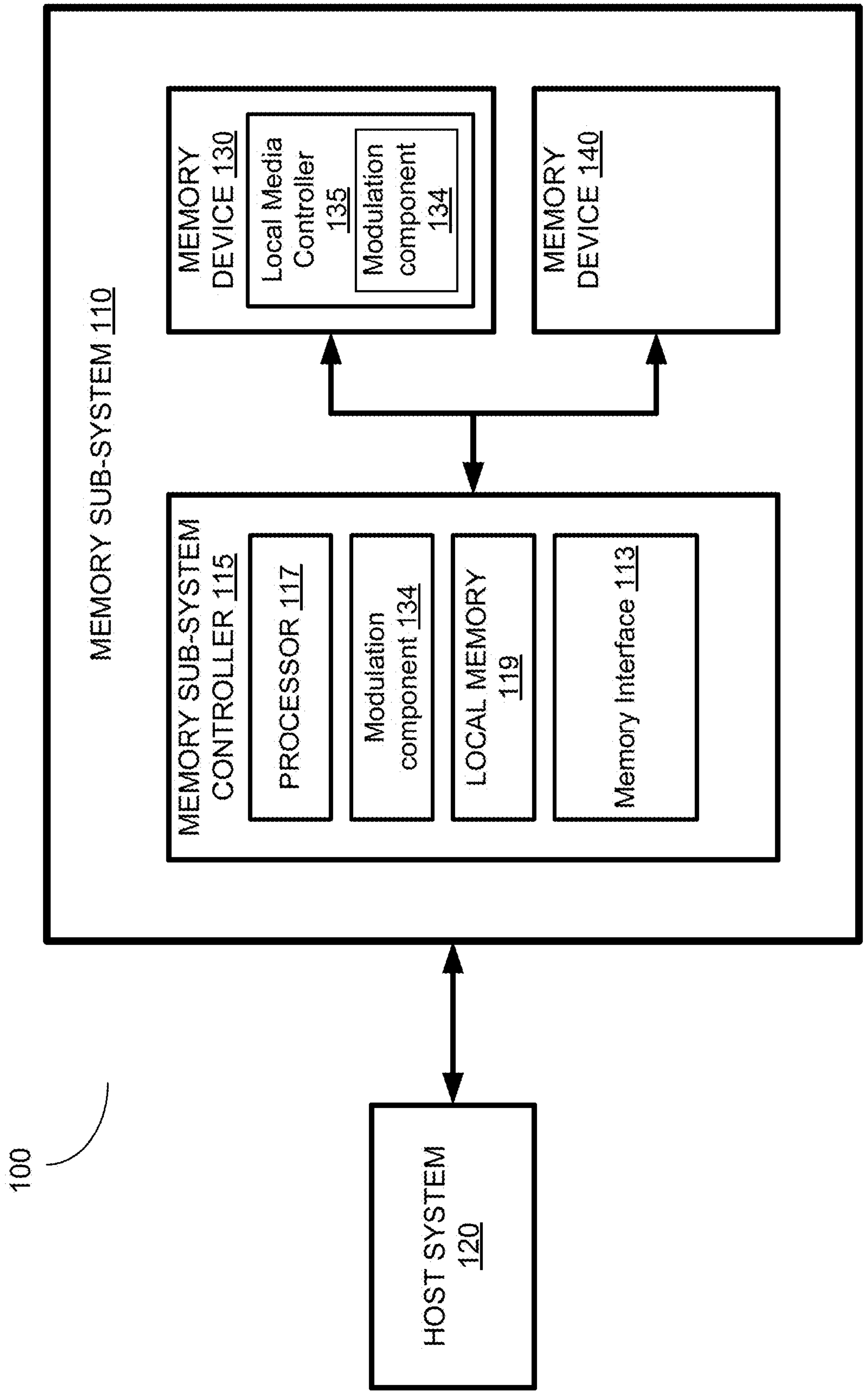
FIG. 1 illustrates an example computing system that includes a memory sub-system in accordance with one or more aspects of the present disclosure.

Aspects of the present disclosure are directed to dynamically configurable data modulation in memory systems. A memory sub-system can include one or more storage devices, memory modules, or a combination of storage devices and memory modules. Examples of storage devices and memory modules are described below in conjunction with FIG. 1. In general, a host system can utilize a memory sub-system that includes one or more memory components, such as memory devices that store data. The host system can provide data to be stored at the memory sub-system and can request data to be retrieved from the memory sub-system.

A memory sub-system can utilize one or more memory devices, including any combination of the different types of non-volatile memory devices and/or volatile memory devices, to store the data provided by the host system. In some implementations, a memory sub-system can be represented by a solid-state drive (SSD), which can include one or more non-volatile memory devices. In some implementations, the non-volatile memory devices can be provided by negative-and (NAND) type flash memory devices. Other examples of non-volatile memory devices are described below in conjunction with FIG. 1. A non-volatile memory device is a package of one or more dice. Each die can include one or more planes. A plane is a portion of a memory device that includes multiple memory cells. Some memory devices can include two or more planes. For some types of non-volatile memory devices (e.g., NAND devices), each plane includes a set of physical blocks. Each block includes a set of pages. "Block" herein shall refer to a set of contiguous or non-contiguous memory pages. A "block" can refer to a unit of the memory device used to store data and can include a group of memory cells. An example of a "block" is an "erasable block," which is the minimal erasable unit of memory, while "page" is a minimal writable unit of memory. Each page includes a set of memory cells. A memory cell is an electronic circuit that stores information.

A memory device can include multiple memory cells arranged in a two-dimensional grid. The memory cells are formed onto a silicon wafer in an array of columns and rows. A memory cell includes a capacitor that holds an electric charge and a transistor that acts as a switch controlling access to the capacitor. Accordingly, the memory cell can be programmed (written to) by applying a certain voltage, which results in an electric charge being held by the capacitor. The memory cells are joined by wordlines, which are conducting lines electrically connected to the control gates of the memory cells, and bitlines, which are conducting lines electrically connected to the drain electrodes of the memory cells.

Depending on the cell type, each memory cell can store one or more bits of binary information and has various logic states that correlate to the number of bits being stored. The logic states can be represented by binary values, such as "0" and "1", or combinations of such values. A memory cell can be programmed (written to) by applying a certain voltage to the memory cell, which results in an electric charge being held by the memory cell, thus allowing modulation of the voltage distributions produced by the memory cell. A set of memory cells referred to as a memory page can be programmed together in a single operation, e.g., by selecting consecutive bitlines.

Precisely controlling the amount of the electric charge stored by the memory cell allows establishing multiple logical levels, thus effectively allowing a single memory cell to store multiple bits of information. A read operation can be performed by comparing the measured threshold voltages (Vt) exhibited by the memory cell to one or more reference voltage levels in order to distinguish between two logical levels for single-level cell (SLCs) and between multiple logical levels for multi-level cells. Each logical level can be translated into a corresponding binary representation of the content of the memory cell. In an illustrative example, a Gray code can be employed for translating the cell charge levels (voltage levels) into their respective binary n-tuples of the size equal to the number of bits-per-cell (BPC) and vice versa. A Gray code refers to an encoding in which adjacent numbers have a single digit different by one.

Memory access operations (e.g., a programming (write) operation, an erase operation, etc.) can be executed with respect to sets of the memory cells, e.g., in response to receiving memory access commands from the host. A memory access operation can specify the requested memory access operation (e.g., write, erase, read, etc.) and a logical address, which the memory sub-system would translate to a physical address identifying a set of memory cells (e.g., a block).

In order to improve endurance of a memory device, the data to be written to the memory device can be modulated to achieve a desired distribution of the charge levels in the memory cells addressable by a given wordline and, in some implementations, also in the memory cells addressable by neighboring wordlines of the given wordline. While a random data pattern encoded by a Gray code would result in uniform distribution of the memory cell charge levels (such that the number of memory cells at an arbitrary chosen charge level being roughly equal to the number of memory cells at any other charge level), employing various non-uniform distributions of memory cell charge levels (i.e., distributions in which the number of memory cells at one charge level can differ by at least a predefined value from the number of memory cells at another charge level) might result in better endurance of the memory device.

Implementations of the present disclosure implementing a flexible modulation technique that would be dynamically configurable to accommodate various desired charge level distributions depending upon, e.g., the target location of data on the memory device.

In an illustrative example, the data to be written to a memory device (e.g., host data) can include one or more original translation units (e.g., pages). Each original translation unit can be split into multiple original data segments of a specified size. A data modulation operation can then be performed on each original segment by permutating, within a given data segment, binary n-tuples of the size equal to the number of bits-per-cell (BPC), in order to achieve a desired logical charge level distribution, which can depend upon the operating conditions (e.g., operating temperature of the memory device and/or a value of a memory endurance metric, such as the number of program/erase cycles) and the characteristics of the target location to which the data will be written on the memory device (e.g., wordline number, block number, die identifier, etc.).

The modulation operation can thus be described as follows:

$$\{0, 1\}_{INITIAL}^{BPC} \rightarrow \{0, 1\}_{MODULATED}^{BPC},$$

where $\{0,1\}_{INITIAL}^{BPC}$ is the initial n-tuple of binary values and $\{0,1\}_{MODULATED}^{BPC}$ is the resulting (modulated) n-tuple of binary values. The modulation operation can be applied to each segment of the original translation unit thus producing a corresponding modulated segment.

In some implementations, the modulation operation can be identified by a corresponding modulation code, which can specify an ordered set of permutations, from which a chosen permutation is performed on the initial (unmodulated) data, a segment size, and a rule to select a permutation for modulating a given data segment, as described in more detail herein below.

The modulated segments can be concatenated together to form a modulated translation unit, which can be further encoded before having been written to its target location of the memory device. In some implementations, each modulated data segment includes a corresponding modulation overhead identifying the permutation implemented by the modulation operation performed on the corresponding unmodulated data segment. Conversely, the modulation code in association with the memory device location identifier can be stored, by the modulation operation, in a metadata structure indexed by the location identifiers. Accordingly, the read operation with respect to the modulated data segment would involve the reverse modulation operation with respect to the modulated data, as described in more detail below.

Thus, the dynamically configurable modulation scheme implemented in accordance with aspects of the present disclosure results in desired distributions (e.g., uniform or non-uniform distributions having desired shapes and/or parameters) of charge levels in memory cells addressable by a given wordline, as well as in memory cells addressable by neighboring wordlines of the given wordline.

Various aspects of the methods and systems are described herein by way of examples, rather than by way of limitation. The systems and methods described herein can be implemented by hardware (e.g., general purpose and/or specialized processing devices, and/or other devices and associated circuitry), software (e.g., instructions executable by a processing device), or a combination thereof.

FIG. 1 illustrates an example computing system 100 that includes a memory sub-system 110 in accordance with some implementations of the present disclosure. The memory sub-system 110 can include media, such as one or more volatile memory devices (e.g., memory device 140), one or more non-volatile memory devices (e.g., memory device 130), or a combination of such.

A memory sub-system 110 can be a storage device, a memory module, or a hybrid of a storage device and memory module. Examples of a storage device include a solid-state drive (SSD), a flash drive, a universal serial bus (USB) flash drive, an embedded Multi-Media Controller (eMMC) drive, a Universal Flash Storage (UFS) drive, a secure digital (SD) and a hard disk drive (HDD). Examples of memory modules include a dual in-line memory module (DIMM), a small outline DIMM (SO-DIMM), and various types of non-volatile dual in-line memory module (NVDIMM).

The computing system 100 can be a computing device such as a desktop computer, laptop computer, network server, mobile device, a vehicle (e.g., airplane, drone, train, automobile, or other conveyance), Internet of Things (IoT) enabled device, embedded computer (e.g., one included in a vehicle, industrial equipment, or a networked commercial device), or such computing device that includes memory and a processing device.

The computing system 100 can include a host system 120 that is coupled to one or more memory sub-systems 110. In some implementations, the host system 120 is coupled to different types of memory sub-system 110. FIG. 1 illustrates one example of a host system 120 coupled to one memory sub-system 110. As used herein, "coupled to" or "coupled with" generally refers to a connection between components, which can be an indirect communicative connection or direct communicative connection (e.g., without intervening components), whether wired or wireless, including connections such as electrical, optical, magnetic, etc.

The host system 120 can include a processor chipset and a software stack executed by the processor chipset. The processor chipset can include one or more cores, one or more caches, a memory controller (e.g., NVDIMM controller), and a storage protocol controller (e.g., PCIe controller, SATA controller). The host system 120 uses the memory sub-system 110, for example, to write data to the memory sub-system 110 and read data from the memory sub-system 110.

The host system 120 can be coupled to the memory sub-system 110 via a physical host interface. Examples of a physical host interface include, but are not limited to, a serial advanced technology attachment (SATA) interface, a peripheral component interconnect express (PCIe) interface, universal serial bus (USB) interface, Fibre Channel, Serial Attached SCSI (SAS), a double data rate (DDR) memory bus, Small Computer System Interface (SCSI), a dual in-line memory module (DIMM) interface (e.g., DIMM socket interface that supports Double Data Rate (DDR)), etc. The physical host interface can be used to transmit data between the host system 120 and the memory sub-system 110. The host system 120 can further utilize an NVM Express (NVMe) interface to access components (e.g., memory devices 130) when the memory sub-system 110 is coupled with the host system 120 by the physical host interface (e.g., PCIe bus). The physical host interface can provide an interface for passing control, address, data, and other signals between the memory sub-system 110 and the host system 120. FIG. 1 illustrates a memory sub-system 110 as an example. In general, the host system 120 can access multiple memory sub-systems via a same communication connection, multiple separate communication connections, and/or a combination of communication connections.

The memory devices 130, 140 can include any combination of the different types of non-volatile memory devices and/or volatile memory devices. The volatile memory devices (e.g., memory device 140) can be, but are not limited to, random access memory (RAM), such as dynamic random access memory (DRAM) and synchronous dynamic random access memory (SDRAM).

Some examples of non-volatile memory devices (e.g., memory device 130) include negative-and (NAND) type flash memory and write-in-place memory, such as a three-dimensional cross-point ("3D cross-point") memory device, which is a cross-point array of non-volatile memory cells. A cross-point array of non-volatile memory can perform bit storage based on a change of bulk resistance, in conjunction with a stackable cross-gridded data access array. Additionally, in contrast to many flash-based memories, cross-point non-volatile memory can perform a write in-place operation, where a non-volatile memory cell can be programmed without the non-volatile memory cell being previously erased. NAND type flash memory includes, for example, two-dimensional NAND (2D NAND) and three-dimensional NAND (3D NAND).

Each of the memory devices 130 can include one or more arrays of memory cells. One type of memory cell, for example, single level cells (SLC) can store one bit per cell. Other types of memory cells, such as multi-level cells (MLCs), triple level cells (TLCs), quad-level cells (QLCs), and penta-level cells (PLCs) can store multiple bits per cell. In some implementations, each of the memory devices 130 can include one or more arrays of memory cells such as SLCs, MLCs, TLCs, QLCs, or any combination of such. In some implementations, a particular memory device can include an SLC portion, and an MLC portion, a TLC portion, a QLC portion, or a PLC portion of memory cells. The memory cells of the memory devices 130 can be grouped as pages that can refer to a logical unit of the memory device used to store data. With some types of memory (e.g., NAND), pages can be grouped to form blocks.

Although non-volatile memory components such as 3D cross-point array of non-volatile memory cells and NAND type flash memory (e.g., 2D NAND, 3D NAND) are described, the memory device 130 can be based on any other type of non-volatile memory, such as read-only memory (ROM), phase change memory (PCM), self-selecting memory, other chalcogenide based memories, ferroelectric transistor random-access memory (FeTRAM), ferroelectric random access memory (FeRAM), magneto random access memory (MRAM), Spin Transfer Torque (STT)-MRAM, conductive bridging RAM (CBRAM), resistive random access memory (RRAM), oxide based RRAM (OxRAM), negative-or (NOR) flash memory, and electrically erasable programmable read-only memory (EEPROM).

A memory sub-system controller 115 ("controller") can communicate with the memory devices 130 to perform operations such as reading data, writing data, or erasing data at the memory devices 130 and other such operations. The memory sub-system controller 115 can include hardware such as one or more integrated circuits and/or discrete components, a buffer memory, or a combination thereof. The hardware can include a digital circuitry with dedicated (i.e., hard-coded) logic to perform the operations described herein. The memory sub-system controller 115 can be a microcontroller, special purpose logic circuitry (e.g., a field programmable gate array (FPGA), an application specific integrated circuit (ASIC), etc.), or other suitable processor.

The memory sub-system controller 115 can be a processing device, which includes one or more processors (e.g., processor 117), configured to execute instructions stored in a local memory 119. In the illustrated example, the local memory 119 of the memory sub-system controller 115 includes an embedded memory configured to store instructions for performing various processes, operations, logic flows, and routines that control operation of the memory sub-system 110, including handling communications between the memory sub-system 110 and the host system 120.

In some implementations, the local memory 119 can include memory registers storing memory pointers, fetched data, etc. The local memory 119 can also include read-only memory (ROM) for storing micro-code. While the example memory sub-system 110 in FIG. 1 has been illustrated as including the memory sub-system controller 115, in another implementation of the present disclosure, a memory sub-system 110 does not include a memory sub-system controller 115, and can instead rely upon external control (e.g., provided by an external host, or by a processor or controller separate from the memory sub-system).

In general, the memory sub-system controller 115 can receive commands or operations from the host system 120 and can convert the commands or operations into instructions or appropriate commands to achieve the desired access to the memory devices 130. The memory sub-system controller 115 can be responsible for other operations such as wear leveling operations, garbage collection operations, error detection and error-correcting code (ECC) operations, encryption operations, caching operations, and address translations between a logical address (e.g., logical block address (LBA), namespace) and a physical address (e.g., physical block address) that are associated with the memory devices 130. The memory sub-system controller 115 can further include host interface circuitry to communicate with the host system 120 via the physical host interface. The host interface circuitry can convert the commands received from the host system into command instructions to access the memory devices 130 as well as convert responses associated with the memory devices 130 into information for the host system 120.

The memory sub-system 110 can also include additional circuitry or components that are not illustrated. In some implementations, the memory sub-system 110 can include a cache or buffer (e.g., DRAM) and address circuitry (e.g., a row decoder and a column decoder) that can receive an address from the memory sub-system controller 115 and decode the address to access the memory devices 130.

In some implementations, the memory devices 130 include local media controllers 135 that operate in conjunction with memory sub-system controller 115 to execute operations on one or more memory cells of the memory devices 130. An external controller (e.g., memory sub-system controller 115) can externally manage the memory device 130 (e.g., perform media management operations on the memory device 130). In some implementations, memory sub-system 110 is a managed memory device, which includes a raw memory device 130 having control logic (e.g., local media controller 135) on the die and a controller (e.g., memory sub-system controller 115) for media management within the same memory device package. An example of a managed memory device is a managed NAND (MNAND) device.

Notably, due to certain physical properties of memory cells of the memory devices 130, certain non-uniform distributions of cell charge levels can result in higher reliability and/or improved endurance of the memory cells, as compared to the reliability and endurance resulting from uniform charge level distributions.

In one embodiment, the memory sub-system 110 includes a memory interface 113. Memory interface 113 is responsible for handling interactions of memory sub-system controller 115 with the memory devices of memory sub-system 110, such as memory device 130. For example, memory interface 113 can send memory access commands corresponding to requests received from host system 120 to memory device 130, such as program commands, read commands, or other commands. In addition, memory interface 113 can receive data from memory device 130, such as data retrieved in response to a read command or a confirmation that a program command was successfully performed. For example, the memory sub-system controller 115 can include a processor 117 (processing device) configured to execute instructions stored in local memory 119 for performing the operations described herein.

In some implementations, the memory sub-system 110 includes a data modulation component 134, which can perform data modulation in order to achieve the desired distributions of the memory cells charges in the memory cells addressable by a given wordline and, in some implementations, also in the memory cells addressable by neighboring wordlines of the given wordline. In an illustrative example, the data modulation component can transform the data to be written to one or more memory devices 130, e.g., by applying, to the data, one or more transformations, such that the transformed data, when converted to corresponding voltage levels, would result in the desired distributions of the memory cells charges in the memory cells addressable by a given wordline and, in some implementations, also in the memory cells addressable by neighboring wordlines of the given wordline, as described in more detail herein above.

In an illustrative example, at least part of the functionality of the data modulation component 134 can be performed by the memory interface 113. In another illustrative example, at least part of the functionality of the data modulation component 134 can be performed by the local media controller 135. In some implementations, data modulation component 134 is implemented by firmware, hardware components, or a combination of the above.

In some implementations, the memory sub-system controller 115 can include a processor 117 (processing device) configured to execute instructions stored in local memory 119 for performing the operations described herein.

Figure 2:
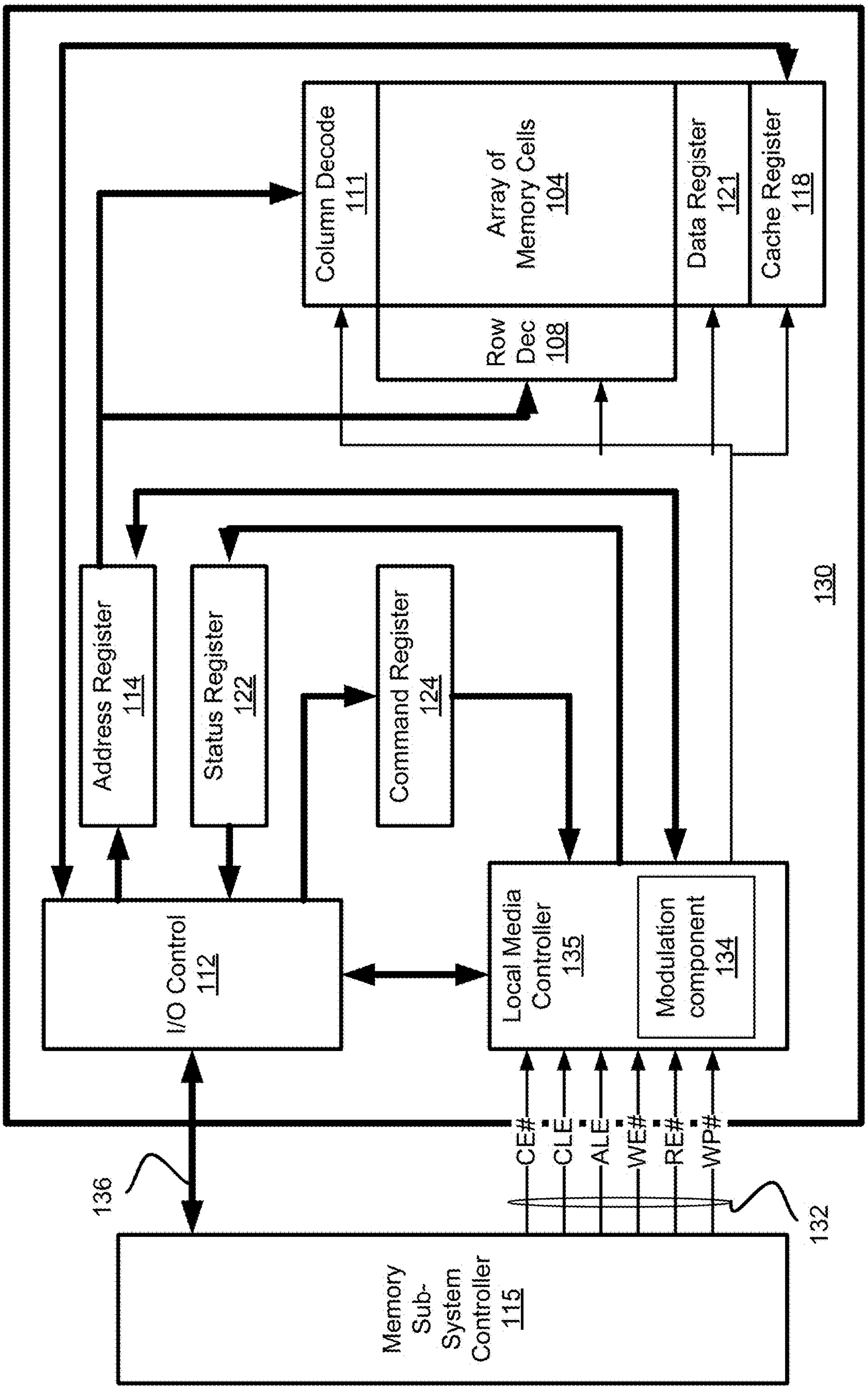
FIG. 2 is a block diagram of a memory device in communication with a memory sub-system controller of a memory sub-system, in accordance with one or more aspects of the present disclosure.

FIG. 2 is a simplified block diagram of a first apparatus, in the form of a memory device 130, in communication with a second apparatus, in the form of a memory sub-system controller 115 of a memory sub-system (e.g., memory sub-system 110 of FIG. 1), according to an implementation. Some examples of electronic systems include personal computers, personal digital assistants (PDAs), digital cameras, digital media players, digital recorders, games, appliances, vehicles, wireless devices, mobile telephones and the like. The memory sub-system controller 115 (e.g., a controller external to the memory device 130), can be a memory controller or other external host device.

Memory device 130 includes an array of memory cells 104 logically arranged in rows and columns. Memory cells of a logical row are typically connected to the same access line (e.g., a wordline) while memory cells of a logical column are typically selectively connected to the same data line (e.g., a bitline). A single access line can be associated with more than one logical row of memory cells and a single data line can be associated with more than one logical column. Memory cells (not shown in FIG. 2) of at least a portion of array of memory cells 104 are capable of being programmed to one of at least two target data states.

Row decode circuitry 108 and column decode circuitry 111 are provided to decode address signals. Address signals are received and decoded to access the array of memory cells 204. Memory device 130 also includes input/output (I/O) control circuitry 112 to manage input of commands, addresses and data to the memory device 130 as well as output of data and status information from the memory device 130. An address register 114 is in communication with I/O control circuitry 112 and row decode circuitry 108 and column decode circuitry 111 to latch the address signals prior to decoding. A command register 124 is in communication with I/O control circuitry 112 and local media controller 135 to latch incoming commands.

A controller (e.g., the local media controller 135 internal to the memory device 130) controls access to the array of memory cells 104 in response to the commands and generates status information for the external memory sub-system controller 115, i.e., the local media controller 135 is configured to perform access operations (e.g., read operations, programming operations and/or erase operations) on the array of memory cells 204. The local media controller 135 is in communication with row decode circuitry 108 and column decode circuitry 111 to control the row decode circuitry 108 and column decode circuitry 111 in response to the addresses.

The local media controller 135 is also in communication with a cache register 218. Cache register 118 latches data, either incoming or outgoing, as directed by the local media controller 135 to temporarily store data while the array of memory cells 104 is busy writing or reading, respectively, other data. During a programming operation (e.g., a write operation), data can be passed from the cache register 118 to the data register 121 for transfer to the array of memory cells 204; then new data can be latched in the cache register 118 from the I/O control circuitry 212. During a read operation, data can be passed from the cache register 118 to the I/O control circuitry 112 for output to the memory sub-system controller 115; then new data can be passed from the data register 121 to the cache register 218. The cache register 118 and/or the data register 121 can form (e.g., can form a portion of) a page buffer of the memory device 130. A page buffer can further include sensing devices (not shown in FIG. 2) to sense a data state of a memory cell of the array of memory cells 204, e.g., by sensing a state of a data line connected to that memory cell. A status register 122 can be in communication with I/O control circuitry 112 and the local memory controller 135 to latch the status information for output to the memory sub-system controller 115.

Memory device 130 receives control signals at the memory sub-system controller 115 from the local media controller 135 over a control link 132. For example, the control signals can include a chip enable signal CE #, a command latch enable signal CLE, an address latch enable signal ALE, a write enable signal WE #, a read enable signal RE #, and a write protect signal WP #. Additional or alternative control signals (not shown) can be further received over control link 132 depending upon the nature of the memory device 130. In some implementations, memory device 130 receives command signals (which represent commands), address signals (which represent addresses), and data signals (which represent data) from the memory sub-system controller 115 over a multiplexed input/output (I/O) bus 136 and outputs data to the memory sub-system controller 115 over I/O bus 136.

For example, the commands can be received over input/output (I/O) pins [7:0] of I/O bus 136 at I/O control circuitry 112 and can then be written into command register 224. The addresses can be received over input/output (I/O) pins [7:0] of I/O bus 136 at I/O control circuitry 112 and can then be written into address register 214. The data can be received over input/output (I/O) pins [7:0] for an 8-bit device or input/output (I/O) pins [15:0] for a 16-bit device at I/O control circuitry 112 and then can be written into cache register 218. The data can be subsequently written into data register 121 for programming the array of memory cells 204.

In an implementation, cache register 118 can be omitted, and the data can be written directly into data register 220. Data can also be output over input/output (I/O) pins [7:0] for an 8-bit device or input/output (I/O) pins [15:0] for a 16-bit device. Although reference can be made to I/O pins, they can include any conductive node providing for electrical connection to the memory device 130 by an external device (e.g., the memory sub-system controller 115), such as conductive pads or conductive bumps as are commonly used.

In some implementations, additional circuitry and signals can be provided, and that the memory device 130 of FIG. 2 has been simplified. It should be recognized that the functionality of the various block components described with reference to FIG. 2 can not necessarily be segregated to distinct components or component portions of an integrated circuit device. For example, a single component or component portion of an integrated circuit device could be adapted to perform the functionality of more than one block component of FIG. 2. Alternatively, one or more components or component portions of an integrated circuit device could be combined to perform the functionality of a single block component of FIG. 2. Additionally, while specific I/O pins are described in accordance with popular conventions for receipt and output of the various signals, it is noted that other combinations or numbers of I/O pins (or other I/O node structures) can be used in the various implementations.

As noted herein above, certain non-uniform distributions of cell charge levels can result in higher reliability and/or improved endurance of the memory cells, as compared to the reliability and endurance resulting from uniform charge level distributions.

Figure 3:
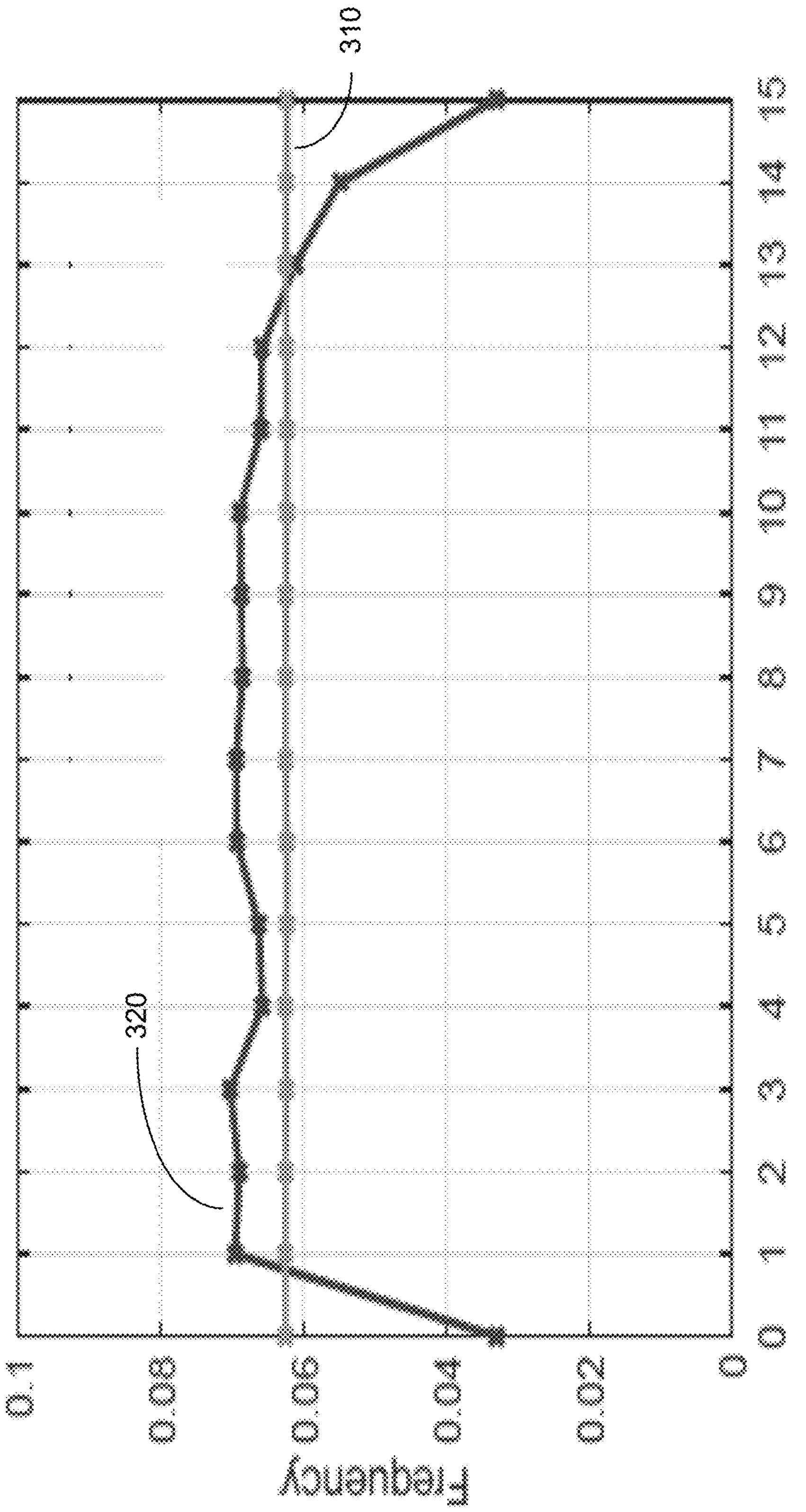
FIG. 3 schematically illustrates charge example distributions of memory cell charge levels, in accordance with aspects of the present disclosure.

FIG. 3 schematically illustrates charge example distributions of memory cell charge levels, in accordance with aspects of the present disclosure. In FIG. 3, plot 320 is an example non-uniform distribution of QLC logical levels over the frequency domain, and plot 310 is an example uniform distribution of QLC logical levels over the frequency domain. As schematically illustrated by FIG. 3, the desired non-uniform distribution 320 for the chosen example wordline can have the inner QLC levels (e.g., 1-14) within a certain frequency range (e.g., between 0.6 and 0.7), while the outer QLC levels (e.g., levels 0 and 15) would fall within a substantially lower range (e.g., between 0.3 and 0.4), such that the center of the frequency range of the outer QLC levels is by at least a predefined value (e.g., 0.3) lower than the center of the frequency range of the inner QLC levels. In some implementations, the desired distribution of the data can be predefined for each location of the memory device based on the characteristic features of the location (e.g., based on the wordline position on a die, such as at the edge of the die or distant from the edge by at least one neighboring wordline).

Figure 4A:
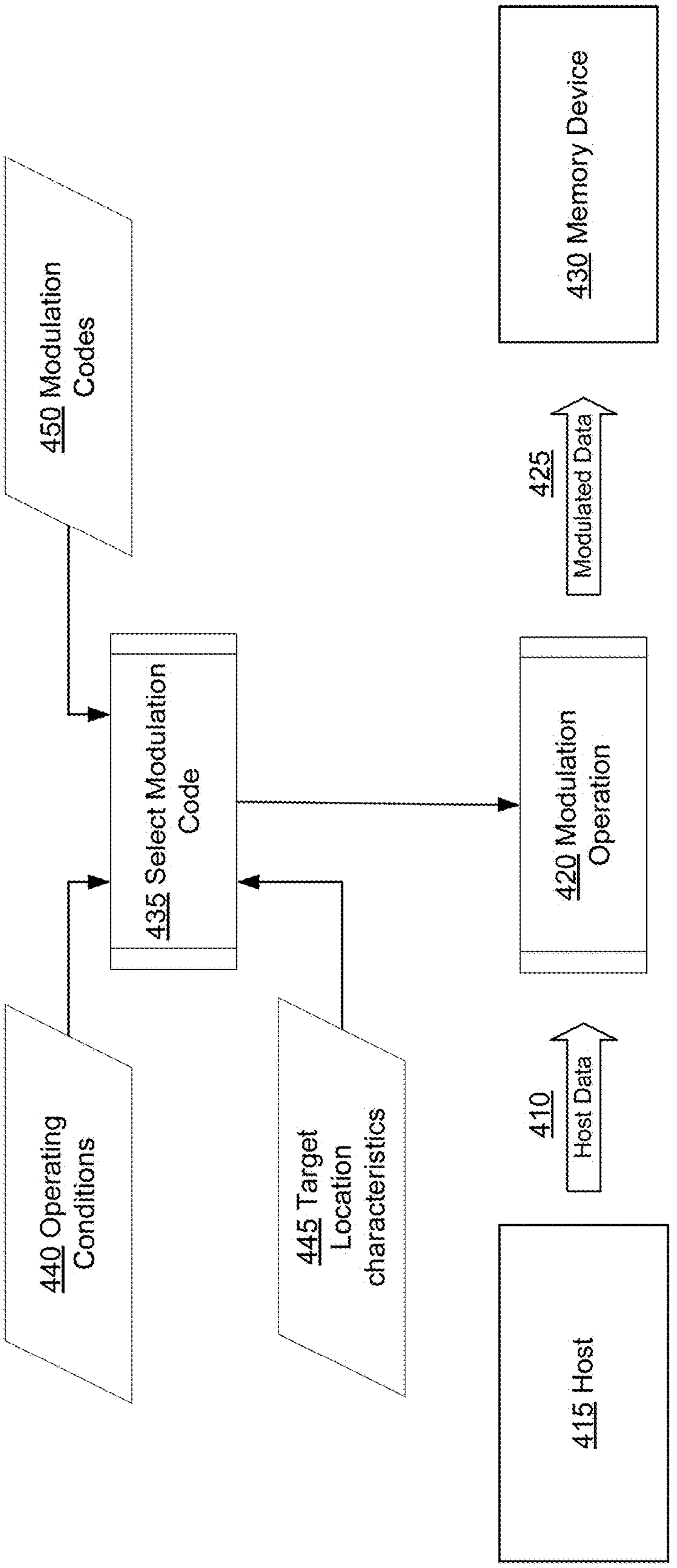
FIG. 4A schematically illustrates an example workflow of implementing dynamically configurable data modulation in a memory write operation performed by a controller operating in accordance with aspects of the present disclosure.

FIG. 4A schematically illustrates an example workflow of implementing dynamically configurable data modulation in a memory write operation performed by a controller operating in accordance with aspects of the present disclosure. As schematically illustrated by FIG. 4A, the host data 410, which is received from the host 415, is transformed by the modulation operation 420 into modulated data 425, which is subsequently written to the memory device 430.

As noted herein above, a modulation operation can be applied to each segment of the original translation unit thus producing a corresponding modulated segment. In some implementations, the modulation operation can be identified by a corresponding modulation code, which can specify an ordered set of permutations (e.g., transforming each initial n-tuple of binary values into a corresponding modulated n-tuple of binary values: $\{0,1\}_{INITIAL}^{BPC}$-> $\{0,1\}_{MODULATED}^{BPC}$), from which a chosen permutation is performed on the initial (unmodulated) data, a segment size, and a rule to select a permutation for modulating a given data segment.

In various illustrative examples, the segment size can be 128 bytes, 256 bytes, etc. In In an illustrative example, the rule to select a permutation for modulating a given data segment can specify one or more logical programming levels (e.g., chosen from levels L0, . . . , L15 for QLC), such that the modulation operation should minimize the number of memory cells at those programing levels in the modulated data segment. In an illustrative example, the rule to select a permutation for modulating a given data segment can specify target shapes of one or more voltage distributions corresponding to respective logical programming levels, with respect to a chosen distance measure, e.g., L1-norm, L2-norm, Kullback-Leibler distance, etc.

In an illustrative example, modulation code 1 specifies an ordered subset of permutations $\{0,1\}_{INITIAL}^{BPC}$->{0, $1\}_{MODULATED}^{BPC}$, the segment size W=128, and the permutation identifying rule selecting a permutation that minimizes the number of memory cells at logical programing level L15 in each data segment;

Modulation code 2 specifies another ordered subset of permutations, the segment size W=256, and the permutation identifying rule selecting a permutation minimizes the number of memory cells at logical programing level L0 in each data segment;

Modulation code 3: specifies another ordered subset of permutations, the segment size W=256, and the permutation identifying rule selecting a permutation that minimizes a linear combination (e.g., a weighted sum) of the numbers of memory cells at logical programing level L0 in each data segment; and Modulation code 4: specifies another ordered subset of permutations, the segment size W=256, and the permutation identifying rule selecting a permutation that results in specified target shapes of one or more voltage distributions corresponding to respective logical programming levels.

Accordingly, the modulation operation 435 selects, based on the operating conditions 440 of the memory device (e.g., operating temperature of the memory device and/or a value of a memory endurance metric, such as the number of program/erase cycles) and the characteristics 445 of the target location on the memory device (e.g., the wordline number, block number, die identifier, etc.) to which the data will be written, a modulation code of a predefined set of modulation codes 450. The number of predefined modulation codes can be chosen to allow a sufficient number of candidate modulated data variants in order to achieve the desired distribution of the data written to the target location of the memory device.

In some implementations, the modulation code can be chosen based on a metadata structure stored in the metadata area of the memory device. In an illustrative example, the metadata structure can store a set of mappings, each mapping associating, with a corresponding modulation code, a combination of a location identifier (e.g., a wordline number, block number, die identifier, etc.) and a set of operating conditions (e.g., operating temperature of the memory device and/or a value of a memory endurance metric, such as the number of program/erase cycles).

Upon identifying the modulation code, the modulation operation can sequentially apply, to each segment of the original translation unit, the permutations of the ordered permutation set specified by the identified modulation code, and compute the resulting value of the metric utilized by the permutation selection rule (e.g., the number of the memory cells at one or more specified logical programming levels). The permutation operation can then select the permutation that results in the desired optimal (e.g., minimum or maximum) value of the metric.

In some implementations, the modulation code that has been utilized for the translation unit can be stored, by the modulation operation, in another metadata structure stored in the metadata area of the memory device. In an illustrative example, the metadata structure can store a set of mappings, each mapping associating a location identifier (e.g., a wordline number, block number, die identifier, etc.) with a corresponding modulation code.

Conversely, the identifier of the permutation that has been applied to a given data segment (e.g., represented by the ordinal number of the permutation in the ordered set of permutations specified by the corresponding modulation code) constitutes the permutation overhead, which can be stored with the corresponding modulated data segment (e.g., is concatenated with the corresponding modulated data segment), as described in more detail herein below.

Figure 4B:
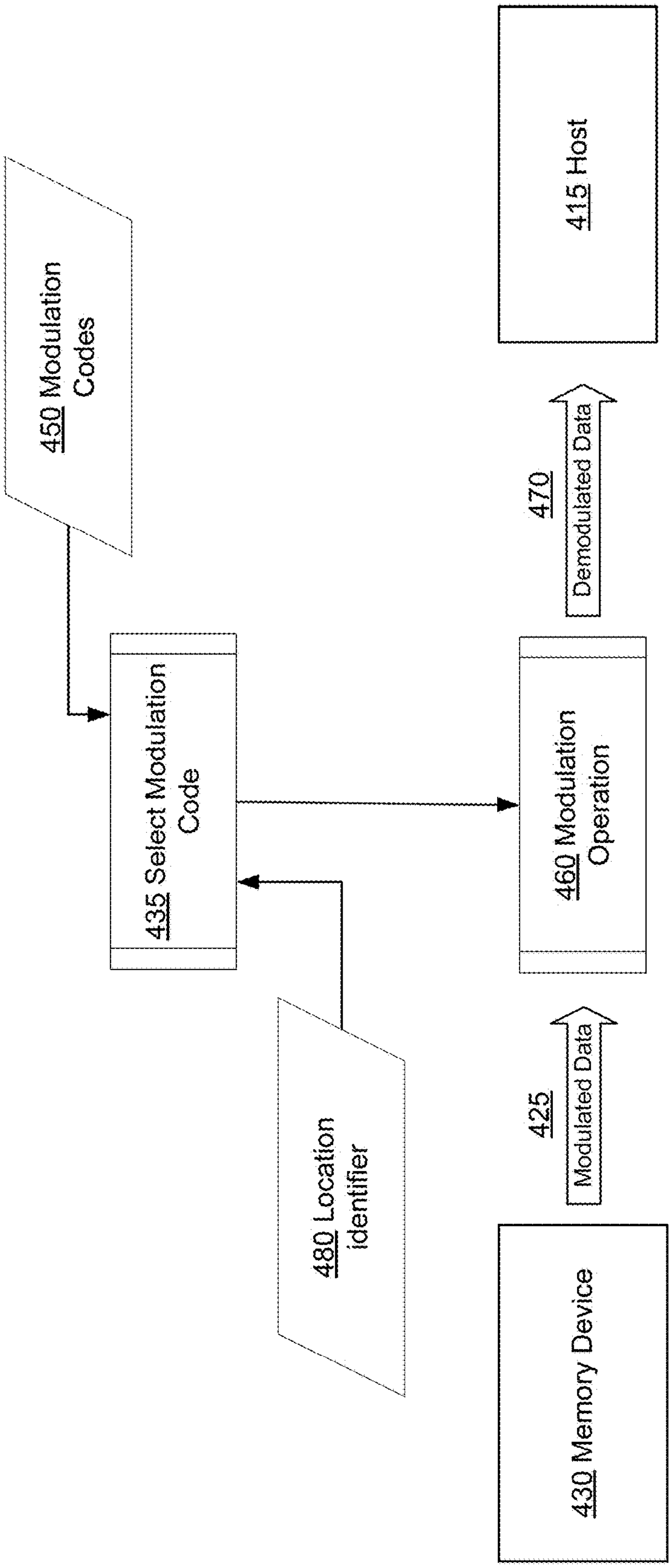
FIG. 4B schematically illustrates an example workflow of implementing dynamically configurable data demodulation in a memory read operation performed by a controller operating in accordance with aspects of the present disclosure.

FIG. 4B schematically illustrates an example workflow of implementing dynamically configurable data demodulation in a memory read operation performed by a controller operating in accordance with aspects of the present disclosure. As schematically illustrated by FIG. 4B, the modulated data 425, which is read from the memory device 430, is transformed by the demodulation operation 460 into modulated data 470, which is subsequently returned to the host 415. The demodulation operation 460 selects, based on the location identifier 480 of the location of the data on the memory device 430, a modulation code of a set of modulation codes 450. The modulation code specifies an ordered set of permutations, a segment size, and a rule to select a permutation for modulating a given data segment. The demodulation operation 460 splits the modulated data 425 into a sequence of modulated data segments of the segment size specified by the modulation code. The modulation operation 460 retrieves, from each modulated data segment, a corresponding modulation overhead identifying the permutation to be reversed for each the corresponding modulated data segment of the modulated data 425, in order to restored the unmodulated data.

Figure 5:
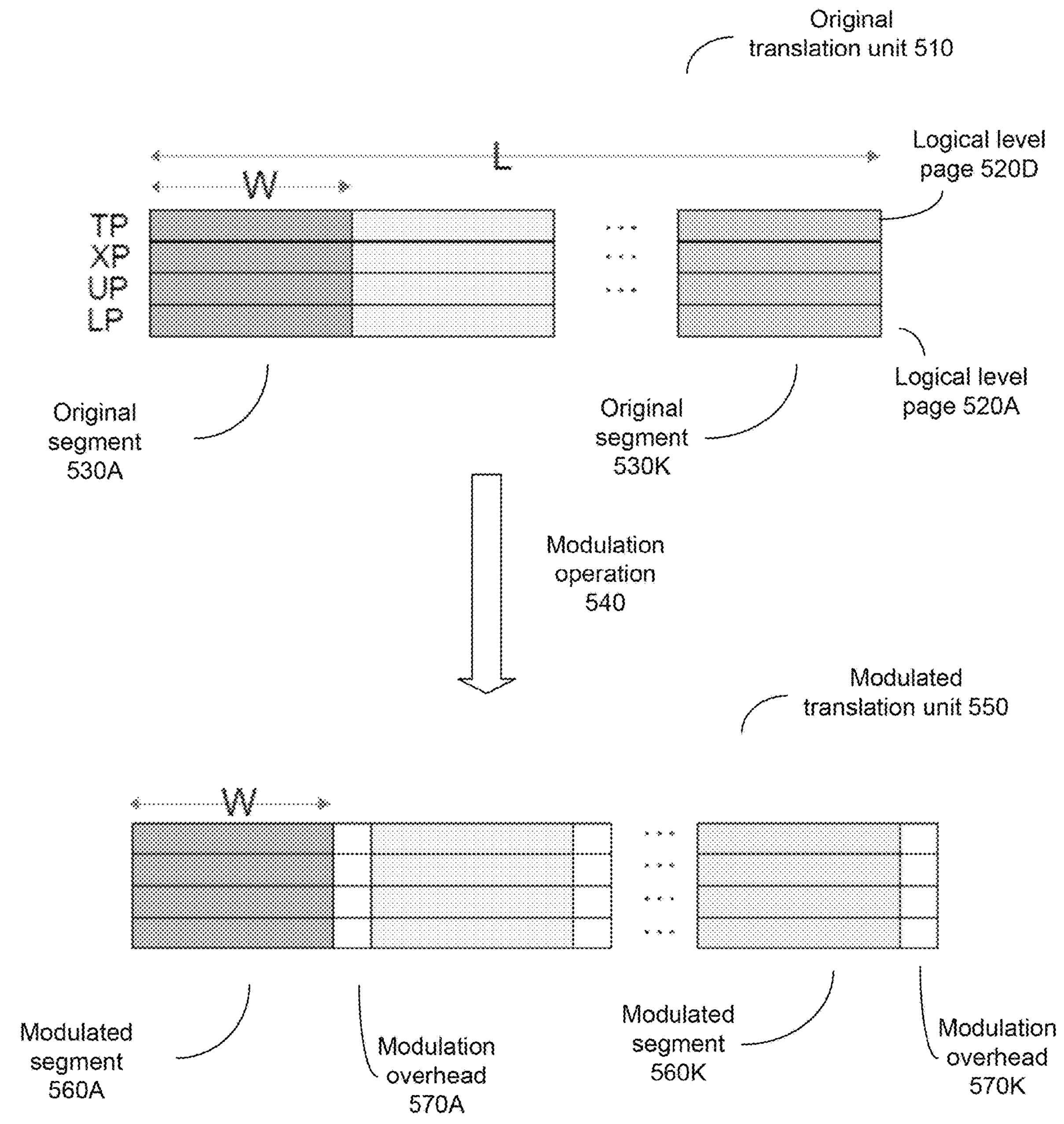
FIG. 5 schematically illustrates an example dynamically configurable data modulation technique, which can be employed for performing a memory write operation by a controller operating in accordance with aspects of the present disclosure.

FIG. 5 schematically illustrates an example dynamically configurable data modulation technique, which can be employed for performing a memory write operation by a controller operating in accordance with aspects of the present disclosure. The data to be written to a memory device (e.g., host data) can include one or more original translation units (e.g., pages) 510 of a predefined size L (e.g., 4K bits). The translation unit can be represented by one or more logical level pages 520A-520D, e.g., the lower page (LP), the upper page (UP), the extra page (XP), and the top page (TP) for QLC memory.

As noted herein above, data modulation can be performed by applying a modulation operation 550 to each original translation unit 510 of the data to be written to a memory device in order to achieve desired (e.g., predefined) charge level distributions in the corresponding modulated translation unit 550.

The modulation operation 550 selects, based on the operating conditions of the memory device (e.g., operating temperature of the memory device and/or a value of a memory endurance metric, such as the number of program/erase cycles) and the characteristics of the target location on the memory device (e.g., the wordline number, block number, die identifier, etc.) to which the data will be written, a modulation code of a predefined set of modulation codes. Accordingly, each original translation unit 510 can be split into multiple original data segments 530A-530K of a size W<L that is specified by the chosen modulation code.

Data modulation operation 550 can be performed by identifying, among the ordered set of permutations specified by the chosen modulation code, the permutation, within each original data segment 530A-530K, of binary n-tuples of the size equal to the number of bits-per-cell (BPC), that results in a desired logical charge level distribution (according to the modulation rule specified by the chosen modulation code).

Accordingly, each original segment 530A-530K of the original translation unit 510 is transformed by operation 520 into a corresponding modulated data segment 560A-560K of the same size as the original segment 530A-530K. Each modulated data segment 560A-560K can be concatenated with a corresponding modulation overhead 570A-570K identifying, among of the ordered set of permutations specified by the chosen modulation code, the permutation that has been used for transforming the data segment. The modulated segments 560A-560K, each concatenated with its respective modulation overhead 570A-570K, can be concatenated together to form a modulated translation unit 550, which can be further encoded before having been written to its target location of the memory device. Storing the modulation overhead in association with the modulated data segment would facilitate the reverse transformation when a read operation is performed with respect to the modulated data, as described in more detail below.

In some implementations, the size of the modulation overhead is ceil ($\log_2(N)$) bits, where ceil ( ) is a function that returns the smallest integer value that exceeds or is equal to its argument, and N is the number of permutations in the chosen modulation code. In an illustrative example, the modulation code specifies an ordered set of 16 permutations, and the modulation overhead would be ceil ($\log_2(16)$)=4 bits.

While in the illustrative example of FIG. 5 modulation overheads 570A-570K follow the corresponding modulated data segments 560A-560K, in other implementations, various other arrangements of the data items are possible, e.g., modulation overheads 570A-570K preceding the corresponding modulated data segments 560A-560K, modulation overheads 570A-570K grouped together and following or preceding a group of corresponding modulated data segments 560A-560K, and so on.

A read operation would involve reading, from the memory device, the modulated translation unit 550 including its constituent modulated segments 560A-560K and their respective modulation overheads 570A-570K. Each modulated segments 560A-560K can then be transformed to the corresponding original segment 530A-530K by performing the reverse modulation operation, thus restoring the original translation unit 510. In some implementations, the reverse modulation operation can involve reversing the permutation identified, among the set of permutation operations specified by the applicable modulation code, by the permutation overhead. The applicable modulation code may be retrieved from the metadata structure mapping the location identifiers to the modulation codes, as described herein above.

Figure 6:
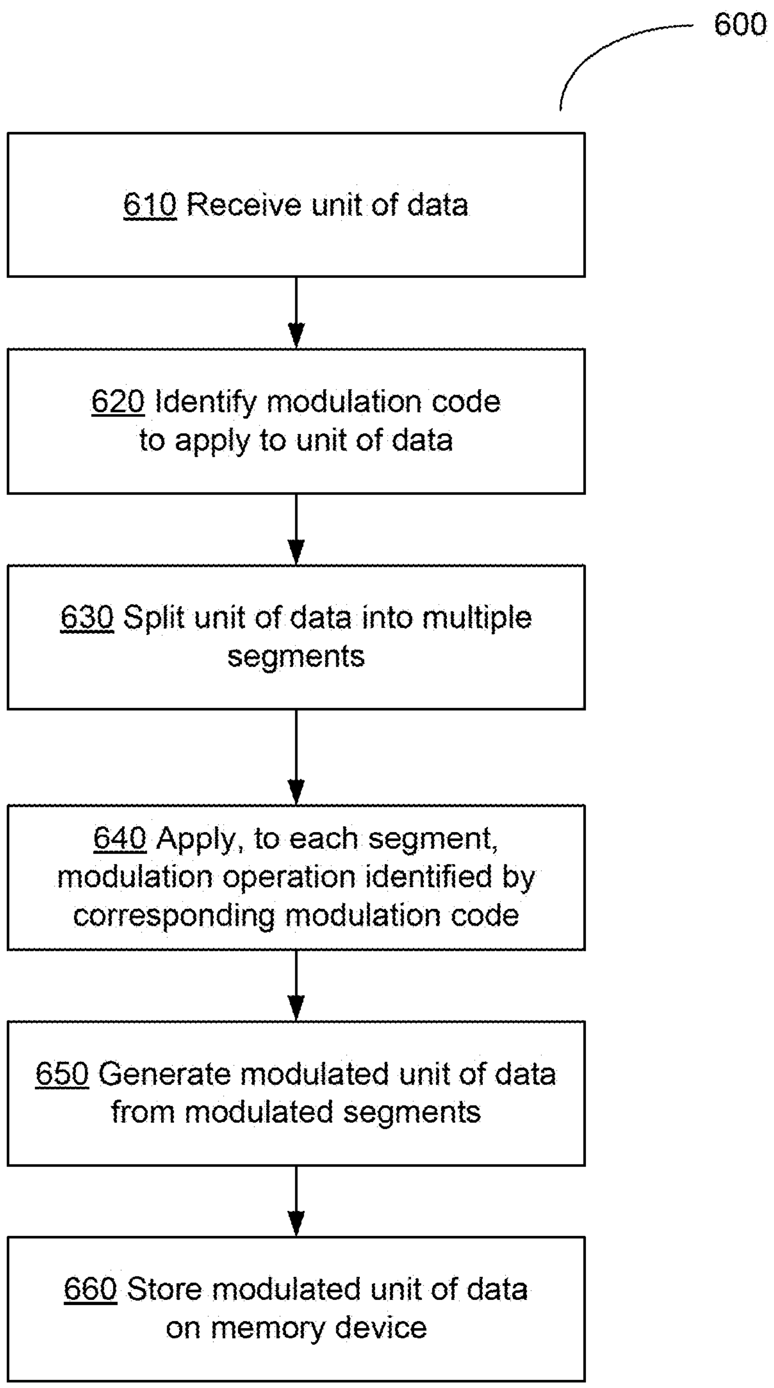
FIG. 6 schematically illustrates an example method of data modulation implemented by a memory controller operating in accordance with aspects of the present disclosure.

FIG. 6 schematically illustrates an example method 600 of data modulation implemented by a memory controller operating in accordance with aspects of the present disclosure. The method 600 can be performed by processing logic that can include hardware (e.g., general purpose or specialized processing devices, circuitry, dedicated logic, programmable logic, microcode, integrated circuits, etc.), software (e.g., instructions run or executed on a processing device), or various combinations thereof. In some implementations, method 600 can be performed by a single processing thread. Alternatively, method 600 can be performed by two or more processing threads, each thread executing one or more individual functions, routines, subroutines, or operations of the method. In an illustrative example, the processing threads implementing method 600 can be synchronized (e.g., using semaphores, critical sections, and/or other thread synchronization mechanisms). Alternatively, the processing threads implementing method 600 can be executed asynchronously with respect to each other. In some implementations, the method 600 is performed by the memory subsystem controller 116 and/or the local media controller 136 of FIG. 1. Operations of the method 600 can be specified by a sequence of command codes, which the processing logic can retrieve from a dedicated storage location. Although shown in a particular sequence or order, unless otherwise specified, the order of the operations can be modified. Thus, the illustrated implementations should be understood only as examples, and the illustrated operations can be performed in a different order, and some operations can be performed in parallel. Additionally, one or more operations can be omitted in various implementations. Thus, not all operations are required in every implementation.

As schematically illustrated by FIG. 6, at operation 610, the processing device implementing the method (e.g., a memory sub-system controller) receives a unit (e.g., a translation unit, such as a page) of data to be written to the memory device.

At operation 620, the processing device identifies, among a predefined set of modulation codes, the modulation code to be applied to the translation unit. In some implementations, the modulation code is determined based on the operating conditions 440 of the memory device (e.g., operating temperature of the memory device and/or a value of a memory endurance metric, such as the number of program/erase cycles) and the characteristics 445 of the target location on the memory device (e.g., the wordline number, block number, die identifier, etc.) to which the data of the translation unit will be written. In some implementations, the modulation code can be chosen based on a metadata structure stored in the metadata area of the memory device. In an illustrative example, the metadata structure can store a set of mappings, each mapping associating, with a corresponding modulation code, a combination of a location identifier (e.g., a wordline number, block number, die identifier, etc.) and a set of operating conditions (e.g., operating temperature of the memory device and/or a value of a memory endurance metric, such as the number of program/erase cycles).

At operation 630, the processing device splits the unit of data into multiple segments of the size specified by the chosen modulation code, such that concatenation of all segments would produce the original unit of data, as described in more detail herein above.

At operation 640, the processing device transforms each segment of the unit of data by a modulation operation specified by the chosen modulation code. The modulation operation may involve identifying, among the ordered set of permutations specified by the chosen modulation code, the permutation, within each original data segment, of binary n-tuples of the size equal to the number of bits-per-cell (BPC), that results in a desired logical charge level distribution (according to the modulation rule specified by the chosen modulation code).

Accordingly, each original segment of the original translation unit is transformed by the modulation operation into a corresponding modulated data segment of the same size as the original segment. Each modulated data segment can be concatenated with a corresponding modulation overhead identifying, among of the ordered set of permutations specified by the chosen modulation code, the permutation that has been used for transforming the data segment.

At operation 650, the processing device generates a modulated unit of data, which includes the modulated segments together with the corresponding modulation overheads. Each modulation overhead identifies a permutation that has been used for modulating a respective original segment. In an illustrative example, each modulated segment can be concatenated with the corresponding modulation overhead. The modulated segments, each concatenated with its respective modulation overhead identifying the permutation that has been applied to the unmodulated data, can be concatenated together to form a modulated translation unit, which can be further encoded before having been written to its target location of the memory device, as described in more detail herein above.

At operation 660, the processing device stores the modulated unit of data on a memory device, and the method terminates.

Figure 7:
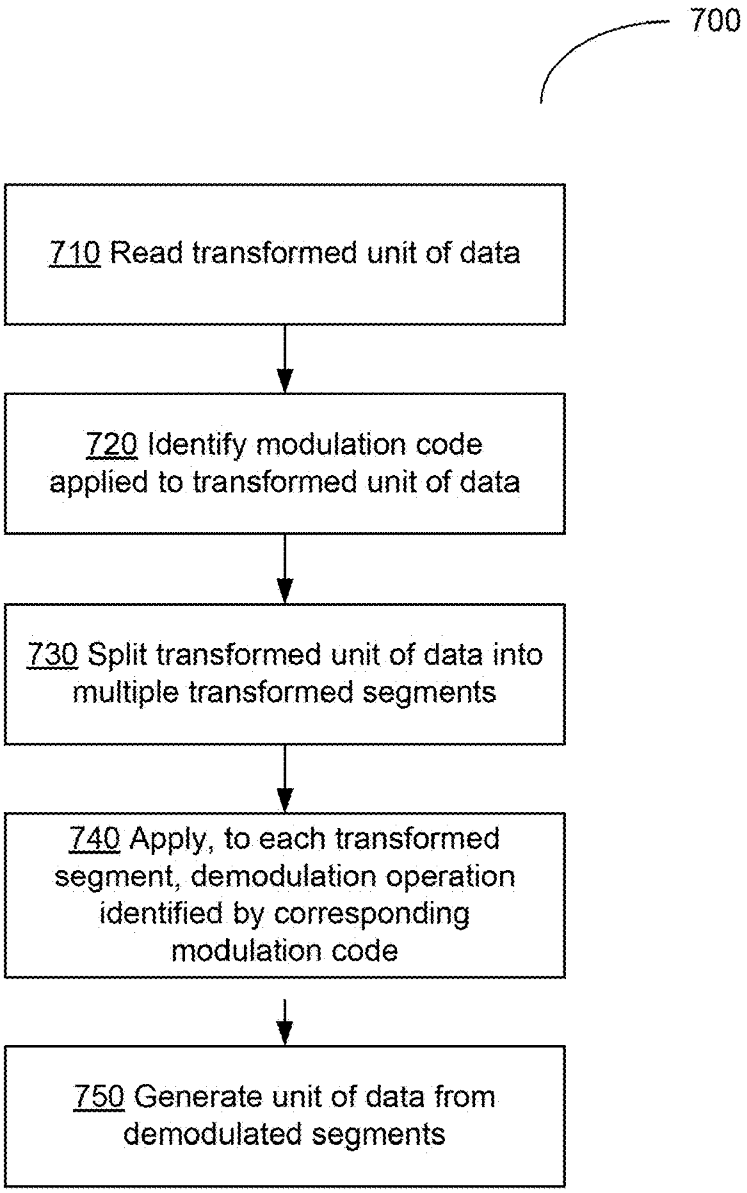
FIG. 7 schematically illustrates an example method of data demodulation implemented by a memory controller operating in accordance with aspects of the present disclosure.

FIG. 7 schematically illustrates an example method 700 of data demodulation implemented by a memory controller operating in accordance with aspects of the present disclosure. The method 700 can be performed by processing logic that can include hardware (e.g., general purpose or specialized processing devices, circuitry, dedicated logic, programmable logic, microcode, integrated circuits, etc.), software (e.g., instructions run or executed on a processing device), or various combinations thereof. In some implementations, method 700 can be performed by a single processing thread. Alternatively, method 700 can be performed by two or more processing threads, each thread executing one or more individual functions, routines, subroutines, or operations of the method. In an illustrative example, the processing threads implementing method 700 can be synchronized (e.g., using semaphores, critical sections, and/or other thread synchronization mechanisms). Alternatively, the processing threads implementing method 700 can be executed asynchronously with respect to each other. In some implementations, the method 700 is performed by the memory sub-system controller 117 and/or the local media controller 137 of FIG. 1. Operations of the method 700 can be specified by a sequence of command codes, which the processing logic can retrieve from a dedicated storage location. Although shown in a particular sequence or order, unless otherwise specified, the order of the operations can be modified. Thus, the illustrated implementations should be understood only as examples, and the illustrated operations can be performed in a different order, and some operations can be performed in parallel. Additionally, one or more operations can be omitted in various implementations. Thus, not all operations are required in every implementation.

As schematically illustrated by FIG. 7, at operation 710, the processing device implementing the method (e.g., a memory sub-system controller) reads a modulated unit (e.g., a translation unit, such as a page) of data.

At operation 720, the processing device identifies, among a predefined set of modulation codes, the modulation code that has been applied to the translation unit. In an illustrative example, the modulation code associated with the modulated unit can be retrieved from a metadata structure maintained by the memory sub-system, as described in more detail herein above.

At operation 730, the processing device splits the modulated unit of data into multiple modulated segments of the predefined size specified by the modulation code, such that concatenation of all segments would produce the modulated unit of data, as described in more detail herein above.

At operation 740, the processing device demodulates each modulated segment by reversing the modulation operation identified by a corresponding modulation code. In an illustrative example, the demodulation operation involves reversing the permutation specified by the corresponding modulation overhead retrieved from the modulated unit.

At operation 750, the processing device generates a demodulated unit of data, which includes the demodulated segments concatenated together, as described in more detail herein above.

Figure 8:
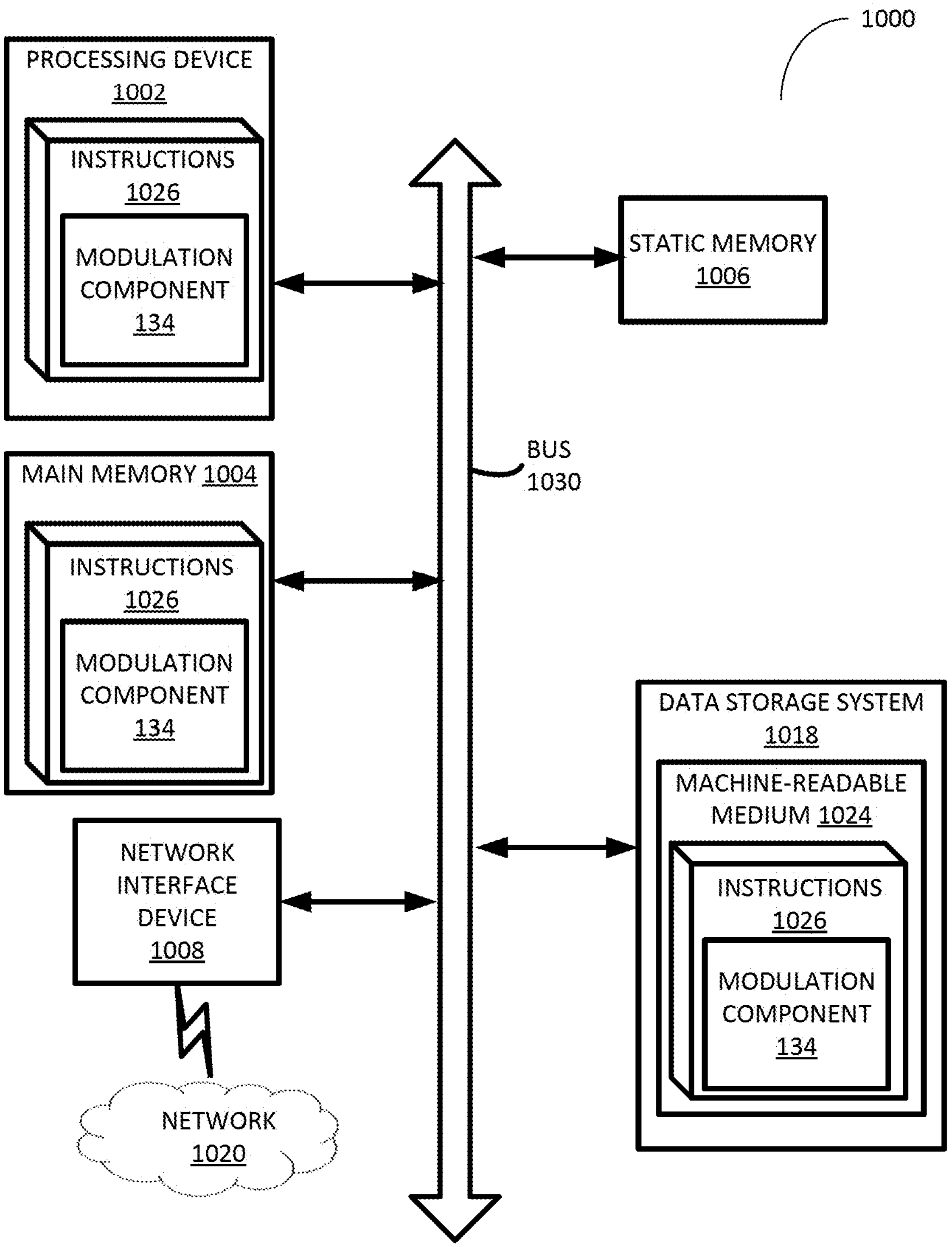
FIG. 8 illustrates an example machine of a computer system within which a set of instructions, for causing the machine to perform any one or more of the methodologies discussed herein, can be executed.

FIG. 8 illustrates an example machine of a computer system 1000 within which a set of instructions, for causing the machine to perform any one or more of the methodologies discussed herein, can be executed. In some implementations, the computer system 1000 can correspond to a host system (e.g., the host system 120 of FIG. 1) that includes, is coupled to, or utilizes a memory sub-system (e.g., the memory sub-system 110 of FIG. 1) or can be used to perform the operations of a controller (e.g., to perform operations corresponding to data modulation component 134 of FIG. 1, including method 500 of data modulation and/or method 600 of data demodulation). In alternative implementations, the machine can be connected (e.g., networked) to other machines in a LAN, an intranet, an extranet, and/or the Internet. The machine can operate in the capacity of a server or a client machine in client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 1000 includes a processing device 1002, a main memory 1004 (e.g., read-only memory (ROM), flash memory, dynamic random access memory (DRAM) such as synchronous DRAM (SDRAM) or Rambus DRAM (RDRAM), etc.), a static memory 1006 (e.g., flash memory, static random access memory (SRAM), etc.), and a data storage system 1018, which communicate with each other via a bus 1030.

Processing device 1002 represents one or more general-purpose processing devices such as a microprocessor, a central processing unit, or the like. More particularly, the processing device can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 1002 can also be one or more special-purpose processing devices such as an application specific integrated circuit (ASIC), a field programmable gate array (FPGA), a digital signal processor (DSP), network processor, or the like. The processing device 1002 is configured to execute instructions 1026 for performing the operations and steps discussed herein. The computer system 1000 can further include a network interface device 1009 to communicate over the network 1020.

The data storage system 1018 can include a machine-readable storage medium 1024 (also known as a computer-readable medium, such as a non-transitory computer-readable medium) on which is stored one or more sets of instructions 1026 or software embodying any one or more of the methodologies or functions described herein. The instructions 1026 can also reside, completely or at least partially, within the main memory 1004 and/or within the processing device 1002 during execution thereof by the computer system 1000, the main memory 1004 and the processing device 1002 also constituting machine-readable storage media. The machine-readable storage medium 1024, data storage system 1018, and/or main memory 1004 can correspond to the memory sub-system 110 of FIG. 1.

In some implementations, the instructions 1026 include instructions to implement functionality corresponding to data modulation component 134 of FIG. 1, including method 500 of data modulation and/or method 600 of data demodulation. While the machine-readable storage medium 1024 is shown in an example implementation to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

All of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general purpose computer selectively activated or reconfigured by a computer program stored in the computer. Such a computer program can be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some implementations, a machine-readable (e.g., computer-readable) medium includes a machine (e.g., a computer) readable storage medium such as a read only memory ("ROM"), random access memory ("RAM"), magnetic disk storage media, optical storage media, flash memory components, etc.

In the foregoing specification, implementations of the disclosure have been described with reference to specific example implementations thereof. It will be evident that various modifications can be made thereto without departing from the broader spirit and scope of implementations of the disclosure as set forth in the following claims. The specification and drawings are, accordingly, to be regarded in an illustrative sense rather than a restrictive sense.

What is claimed is:

1. A system comprising:

a memory device; and a processing device, operatively coupled with the memory device, to perform operations comprising:

receiving a unit of data to be stored on the memory device;

identifying a set of parameter values that identify a target location of the unit of data on the memory device;

determining a modulation code corresponding to the set of parameter values;

identifying, among an ordered set of permutations specified by the modulation code, a permutation, within each original segment of the unit of data, of binary n-tuples of a specified size, that results in a desired logical charge level distribution;

modulating the unit of data by applying, to the unit of data, the identified permutation to a corresponding original segment of the unit of data; and storing, on the memory device, the modulated unit of data.

2. The system of claim 1, wherein the set of parameter values further characterizes operating conditions of the memory device.

3. The system of claim 1, wherein the set of parameter values comprises a value of a media endurance metric associated with the target location.

4. The system of claim 1, wherein the set of parameter values comprises a value of an operating temperature associated with the target location.

5. The system of claim 1, wherein the set of parameter values comprises at least one of: a die identifier, a block identifier, or a wordline identifier associated with the target location.

6. The system of claim 1, wherein the operations further comprise:

storing, in a metadata structure, the modulation code in association with the target location.

7. The system of claim 1, wherein the operations further comprise:

reading the modulated unit of data;

determining the modulation code associated with the modulated unit of data on the memory device; and demodulating the modulated unit of data by a reverse modulation operation identified by the modulation code.

8. A non-transitory computer-readable storage medium comprising instructions that, when executed by a processing device, cause the processing device to perform operations comprising:

receiving a unit of data to be stored on a memory device;

identifying a set of parameter values that identify a target location of the unit of data on the memory device;

determining a modulation code corresponding to the set of parameter values;

identifying, among an ordered set of permutations specified by the modulation code, a permutation, within each original segment of the unit of data, of binary n-tuples of a specified size, that results in a desired logical charge level distribution;

modulating the unit of data by applying, to the unit of data, the identified permutation to a corresponding original segment of the unit of data; and storing, on the memory device, the modulated unit of data.

9. The non-transitory computer-readable storage medium of claim 8, wherein the set of parameter values further characterizes operating conditions of the memory device.

10. The non-transitory computer-readable storage medium of claim 8, wherein the set of parameter values comprises a value of a media endurance metric associated with the target location.

11. The non-transitory computer-readable storage medium of claim 8, wherein the set of parameter values comprises a value of an operating temperature associated with the target location.

12. The non-transitory computer-readable storage medium of claim 8, wherein the operations further comprise:

storing, in a metadata structure, the modulation code in association with the target location.

13. The non-transitory computer-readable storage medium of claim 8, wherein modulating the unit of data results in a desired distribution of logical programming levels over a plurality of memory cells of the target location.

14. The non-transitory computer-readable storage medium of claim 8, wherein the operations further comprise:

reading the modulated unit of data;

determining the modulation code associated with the modulated unit of data on the memory device; and demodulating the modulated unit of data by a reverse modulation operation identified by the modulation code.

15. A method, comprising:

receiving, by a processing device, a unit of data to be stored on a memory device;

identifying a set of parameter values that identify a target location of the unit of data on the memory device;

determining a modulation code corresponding to the set of parameter values;

identifying, among an ordered set of permutations specified by the modulation code, a permutation, within each original segment of the unit of data, of binary n-tuples of a specified size, that results in a desired logical charge level distribution;

modulating the unit of data by applying, to the unit of data, the identified permutation to a corresponding original segment of the unit of data; and storing, on the memory device, the modulated unit of data.

16. The method of claim 15, wherein the set of parameter values further characterizes operating conditions of the memory device.

17. The method of claim 15, wherein the set of parameter values comprises a value of a media endurance metric associated with the target location.

18. The method of claim 15, wherein the set of parameter values comprises a value of an operating temperature associated with the target location.

19. The method of claim 15, wherein the set of parameter values comprises at least one of: a die identifier, a block identifier, or a wordline identifier associated with the target location.

* * * * *